3,556,942
METHOD FOR OBTAINING AMYLOSE FROM COOKED STARCH SOLUTIONS
Robert J. Hathaway, Decatur, Ill., assignor to A. E. Staley Manufacturing Company, Decatur, Ill., a corporation of Delaware
No Drawing. Filed July 17, 1967, Ser. No. 653,652
Int. Cl. C13l 1/00
U.S. Cl. 195—31     9 Claims

ABSTRACT OF THE DISCLOSURE

Method for fractionating and separating amylose from a cooked starch solution by contacting said cooked starch solution with a material exhibiting pullulanase activity for a time sufficient to reduce the solution's viscosity to a viscosity of preferably less than 10,000 centipoises measured at 40° C., and thereafter separating said amylose from the solution.

---

This invention is directed to a method for fractionating starch and particularly to an improved method for separating amylose from a cooked starch solution.

Ordinary starch is known to consist of two types of polymers of glucose, the linear polymer called amylose (sometimes referred to as the "A-fraction"), and the branch-chain polymer called amylopectin (sometimes referred to as the "B-fraction"). The relative content of amylose and amylopectin varies with the source of the starch. For example, tapioca contains about 20% amylose; potato starch and corn starch about 27%. The amylose molecule is considered to be a long, linear chain of anhydroglucose units. The amylopectin molecule, on the other hand, is considered to be a larger, complex branched chain of three-like structure with many of the branches themselves having branches.

The two starch fractions (amylose and amylopectin) have substantially different properties. According to Kerr, Chemistry and Industry of Starch, Academic Press (1950), the amylose molecule is of lower molecular weight than the amylopectin molecule and possesses one non-reducing end group per starch molecule. Amylopectin is a higher molecular weight, with one non-reducing end group for each 20 to 30 glucose residues. Amylose has a high intrinsic viscosity and a low solution stability in water at ordinary temperature and concentration, while amylopectin has a fairly high solution stability but about the same intrinsic viscosity.

Several different approaches have been taken with the view of producing the individual fractions. One approach has been the development of corn mutants such as waxy maize and amylomaize. The waxy maize corn consists essentially of amylopectin while the amylomaize corn contains starch which is high in amylose. Other approaches include mechanical or chemical treatment of starch in a particular manner to effect a separation of the two fractions.

Each of the above approaches, however, has its drawbacks. For example, the costs for growing and processing corn hybrids or mutants solely for industrial uses are high while the chemical methods are beset with problems of recovering, separating, or disposing of the chemical agents used in the separation process. The mechanical or physical treatment of starch, such as by subjecting cooked starch to a high shear, is also unsatisfactory because shearing generally causes some degradation of the starch fractions.

Still another process for fractionating starch from an aqueous suspension can be found in U.S. Pat. 3,067,067 to Wagoner et al.

Stated briefly the above patent discloses a process whereby a mixture of starch and water is heated to a temperature above 120° C. to provide a fluid solution of starch in water. The starch solution is then carefully cooled to and maintained at a temperature above 49° C. to provide a stabilized, non-congealing starch solution from which a solid fraction enriched in crystalline amylose is precipitated and then separated therefrom.

Although the Wagoner et al. process is a novel and economical method for obtaining high purity amylose and amylopectin, it does possess certain operational limitations. One of such limitations is that it is necessary for the fractionation process to be conducted on starch solutions having a starch concentration which imparts to the solution a viscosity of less than 1,500 centipoises and preferably a viscosity of between 400–600 centipoises. Depending on the variety of starch being used, the rate of heating, the final temperature of the solution, the manner in which the starch solution has been treated, etc., it is not uncommon to find that a starch solution containing 10% by weight d.s. solids will have a viscosity of 4,000 centipoises or even higher at temperatures of between 25° C.–45° C. This means that the concentration of the starch solution should preferably be maintained below 10% by weight d.s. if a viscosity of less than 1,500 centipoises is to be obtained. In instances where the viscosity of the solution is above that which is preferred for separating high purity amylose and amylopectin fractions, Wagoner et al. recommend that the starch solution be diluted with water to reduce the solution's viscosity, prior to or during the separation step. Although diluting the starch solution with water effectively reduces the solution's viscosity, this additional water also reduces the concentration of starch in the solution and thus increases the cost for obtaining the starch fractions since this additional water must eventually be removed.

Another limitation of the Wagoner et al. process is that the starch fractionation process is limited to "stabilized" or noncongealing starch solutions. This means that if the starch solution has gelled or has started to gel, amylose cannot be separated therefrom.

It is therefore a general object of this invention to provide a method for separating amylose from starch which overcomes the limitations and disadvantages heretofore found in starch fractionation processes.

Another object of this invention is to provide a more efficient method for separating amylose from a cooked, more highly concentrated, starch solution.

Another object of this invention is to provide a method for separating amylose from cooked starch without substantially degrading the amylose fraction.

A further object of this invention is to provide an improved method for releasing a solid starch fraction enriched in amylose from a starch solution containing both amylose and amylopectin without first "stabilizing" the starch solution.

Still another object of this invention is to provide a method for separating a solid amylose fraction from a solution of cooked starch and particularly from a solution of cooked root or tuber starches.

Briefly stated, these and other objects of this invention are accomplished by contacting a solution of cooked starch with a material exhibiting pullulanase activity for a time sufficient to reduce the viscosity of the solution to a viscosity which will release from the fluid solution a solid fraction enriched in amylose without stabilizing or adding a diluting liquid to the cooked solution.

More specifically these and other objects of this invention are accomplished by:

(1) Heating a suspension of starch in water to a temperature and for a time sufficient to transform substantially all of the suspended starch into a fluid solution without causing substantial degradation of the starch molecules;

(2) Cooling rapidly said starch solution to a temperature below that which will substantially deactivate pullulanase activity;

(3) Releasing a solid starch fraction enriched in amylose from said solution by treating said cooled starch solution with a material exhibiting pullulanase activity for a time evidenced by a reduction in the viscosity of the starch solution to a viscosity of preferably below 10,000 centipoises measured at 40° C.; and (4) Separating from said treated starch solution said solid starch fraction enriched in amylose.

As is indicated above, a suspension of starch containing a substantial amount of amylose in water is first heated to a temperature which will transform the suspended starch granules into a cooked fluid solution. This transformation to a "solution" is quite important, as no fractionation of the starch polymers can be achieved unless this transformation occurs. Characteristically, this starch solution is mobile and, if cooled and allowed to stand for a time at room temperature, will show increased viscosity and eventually will congeal. Once a gel is formed it generally cannot be put back into solution unless heated to a temperature in excess of 120° C. If the cooked solutions are agitated while cooling they become very thick, but remain mobile if the starch concentration is not too great. Such a mixture probably contains discrete particles of rigid gel in circulation and can be referred to as a "fluid" gel. Preferably the enzyme is added as early as possible after cooking. However, starch gels of very high viscosity (e.g. 30,000 cps.) can be thinned by the addition of the amylo-16-glucosidase and an amylose rich fraction separated therefrom. In this case though, thinning generally occurs at a slower rate.

A starch solution can be readily prepared by heating a suspension of starch in water at atmospheric pressure to a temperature of about 95°–100° C. for a period of time ranging from about 10 to 40 minutes. If desired, the time required for obtaining a solution of starch can be substantially reduced by heating the starch suspension to temperatures in excess of 150° C. and at pressures above atmospheric such as in an autoclave or with an apparatus of the type disclosed in U.S. Pat. No. 3,101,284 to O. R. Etheridge. In the Etheridge apparatus, steam at superatmospheric pressure is continuously mixed with the starch suspension in the throat of a steam jet. In this way, the suspension is brought to the desired temperature virtually instantaneously and the starch is cooked to a fluid solution within a few seconds. In the apparatus of the U.S. patent referred to, the steam-heated suspension flows downward into and through a detention zone where the hot suspension is maintained at an elevated temperature for any desirable period of time. Other forms of the Etheridge apparatus such as those disclosed in U.S. Pat. Nos. 2,871,146; 2,582,198; and 2,805,966, may also be used for solubilizing a suspension of starch.

It is generally desirable to agitate the starch suspension when bringing it up to temperature in order to assure uniform heating and rapid heat transfer. This is readily accomplished in the steam-jet type of apparatus already described. During cooling of the starch solution, it is also advantageous to continuously agitate the starch solution as continuous agitation tends to minimize the formation of a crust or a surface gel as well as assuring uniform and constant cooling of the starch solution.

One of the advantages realized by this invention is that the rate and manner by which the starch solution is cooled prior to adding the material exhibiting pullulanase activity is not particularly critical. This means that the starch solution may be cooled as rapidly or as slowly as desired. Preferably, though, the starch solution is cooled rapidly and with constant agitation. The temperature to which the starch solution is cooled is that temperature which will not substantially deactivate the material exhibiting pullulanase activity. This temperature of deactivation will generally vary depending on the type of material utilized. This means used for cooling the starch solution can also vary. For example, various cooling devices such as conventional refrigeration or heat exchangers can be used to advantage.

Any material capable of selectively hydrolyzing alpha-1,6-glucosidic bonds of the amylopectin fraction of starch may be used in the process of this invention and is referred to herein as an enzyme preparation (enzyme) exhibiting amylo-1,6-glucosidase activity.

Such material is referred to herein as an enzyme (enzyme preparation) exhibiting pullulanase activity. The enzyme referred to in the literature as "pullulanase" is preferred because of its alpha-1,6-glucosidic specificity. Other enzymes capable of hydrolyzing alpha-1,6-glucosidic bonds and which are referred to in the literature include "iso-amylase" and "R enzyme."

According to the literature this enzyme was first reported by Bender and Wallenfels in Biochemische Zeitschrift, vol. 334, pp. 79–95 (1961), and was used by these authors in the study of the structure of glycogen and amylopectin. Still other more recent publications covering the use and production of this enzyme can be found in Cereal Chemistry, vol. 43, pp. 658–669, (1966), and in Methods of Enzymology, vol. 8, pp. 555–559 (1966). According to the above references, pullulanase can be readily obtained from the organism *Aerobacter aerogenes*. Certain strains of the organism, *Aerobacter aerogenes*, have been reported to be particularly good sources for obtaining this enzyme. For example, *Aerobacter aerogenes* (U–58), which is reported to be a direct descendant of the original strain isolated by Bender and Wallenfels, has been found to be a particularly good source of this enzyme. Various ultraviolet induced mutants of *Aerobacter aerogenes* (U–58) can also be used. Other reported strains of *Aerobacter aerogenes* which can be used include *Aerobacter aerogenes* ATCC 9621 and ATCC 15050.

Preparations of pullulanase can be obtained from the organism *Aerobacter aerogenes* by known cultivating methods. A suitable technique is described in the Bender and Wallenfels publication previously referred to. If desired, the crude preparation can then be purified prior to use. However, the utility of the enzyme in the process of this invention is not restricted to preparations of any specific purity. Obviously, though, the use of an enzyme substantially free of other competing enzymes such as alpha-, beta- and glucomylases, transglucosidase, etc. would be advantageous.

Maximum efficiency is obtained when the enzyme is added to a starch solution which is maintained at a temperature of between 30° and 50° C. and a pH of between 6.0 and 7.5. Useful results, however, can be obtained when the enzyme is added to starch solutions outside of these ranges such as at a temperature of between 20° C. and 100° C. and a pH of between 5.0 and 8.5, but at greater expense and lesser efficiency. Generally stated, the enzyme is preferably added to a starch solution maintained at conditions which are optimum for hydrolyzing alpha-1,6-glucosidic bonds.

The amount of enzyme added to the cooked starch solution is not critical and depends to some degree on the initial viscosity of the starch solution, the desired degree and rate at which the viscosity of the solution is to be reduced, the activity of the enzyme, the concentration of the starch solution, reaction conditions, etc. Generally, the amount of enzyme used is that amount which will effectively initiate the separation of amylose from a starch solution. Normally such an amount is evidenced by a reduction in the solution's viscosity to a viscosity of less than 10,000 centipoises in less than 24 hours, and preferably in less than 12 hours.

Since the starch solution's viscosity is reduced by the addition of an enzyme exhibiting pullulanase activity the need for diluting the starch solution with a diluent and thus reducing the concentration of starch in the starch solution is avoided. Further, by the use of an enzyme exhibiting amylo-1,6-glucosidase activity, a solid starch fraction enriched in amylose can be obtained without first "stabilizing" the starch solution or adding thereto a complexing agent.

Since the viscosity of a starch solution can now be controlled by the use of an enzyme exhibiting pullulanase activity, the solution's starch concentration is not especially critical to the practice of this invention and can be varied over a broad range. Concentrations as low as 2.5% and as high as 35–40% may be used at higher temperatures. (Concentrations of 35–40% d.s. correspond to starch solutions having a Baumé of about 21–23.) However, because of economic and process limitations, cooked starch concentrations of between 10% and 25% weight d.s. are generally used. Although the concentration of the starch solution may be varied over a broad range, the viscosity of the starch solution is preferably maintained (by action of pullulanase) at a viscosity of less than 6,000 centipoises. However, if a high speed centrifuge is employed for the separation of the solid fraction from the starch solution, the viscosity of the solution can be as high as 10,000 centipoises. Higher viscosities generally require that the amylopectin be debranched more extensively by either the addition of more enzyme or by the use of longer contact times in order to effect a good amylose separation.

The viscosity measurements which are referred to herein were determined on a Brookfield RVT viscometer at a spindle speed of 20 r.p.m. and a temperature of about 40° C.

Although not essential, the starch solution can be maintained at the desired pH by the use of a buffering agent such as phosphates, citrates, acetates and the like. Bacterial growth can be controlled by the use of a preservative such as toluene, sodium azide and the like.

Any variety of starch or mixture of starches containing a substantial proportion of amylose may be used. These include, for example, the root or tuber starches exemplified by tapioca and potato starch and the cereal starches exemplified by corn, rice and wheat starch. Genetically modified corn high in amylose may also be used. Pregelatinized starches, i.e., starches which are often referred to as cold-water-swelling or cold-water-soluble, as well as uncooled pasted starches, may also be used. Slightly modified or slightly dextrinized starch, or starch that has been reacted to form a derivative with a minor amount of substitution whether before or after gelatinization, may be substituted for native starch. However, such starch products are more expensive; and as the extent of reaction of the starch is increased, the starch fractions are of lower purity, or the yield on separation is reduced, or both. Furthermore, substitution of the starch granules tends to inhibit the debranching action of the enzyme. The root or tuber starches and particularly starches containing high molecular weight amylose such as those derived from potatoes are preferably used. The higher molecular weight amyloses tend to form stronger, more coherent films and coatings.

The separated amylose fractions may be cast from solution as films useful in packaging, particularly foodstuffs (e.g., as sausage casings) since the amylose is digestible by humans. The structure of amylose resembles cellulose, and similarly many of its derivatives are thermoplastic. Accordingly, amylose and its derivatives (for example, the acetates) are useful in the manufacture of fibers and molded products of the nature of cellulosic products. The amylopectin fraction which remains after the amylose has been separated can be used in the manufacture of syrups, dextrins or other dextrose products.

The apparent amylose contents of starches referred to in the disclosure and examples were determined in the following manner: 0.1 gram of high amylose starch is dissolved in 10 mls. 1 normal KOH, and diluted to 100 ml. with distilled water. A 5 ml. aliquot of the starch solution is mixed with 100 ml. of water, 3 ml. 1 N HCL, 1 ml. 0.2% $I_2$ in a 2% solution of potassium iodide, and diluted to 500 ml. with distilled water. A reference solution is similarly prepared from a specially purified amylose standard, containing substantially 100% amylose. The absorbance for each sample was determined at 638 millimicrons. The ratio times 100 is the percent apparent amylose.

In the examples below, the percent amylose separated (AS) was calculated in the following manner:

$$AS = \frac{(WY)(AA)}{X} 100$$

WY is the weight percent yield of the solid fraction separated from the starch solution based on the total weight of the cooked starch material on a dry substance basis.

WY is the weight percent yield of the solid fraction separated from the starch solution based on the total weight of the cooked starch material on a dry substance basis.

AA is the percent apparent amylose contained in the above solid fraction, as determined by absorbance of iodine blue color.

X is the percent apparent amylose present in the parent starches. For corn and potatoe starch the apparent amylose was determined to be 27%. For tapioca starch it was 20%.

The following examples are given for the purpose of illustration only and are not to be interpreted as specific limitations of this invention.

EXAMPLE 1

A 22% by weight d.s. potato starch slurry was prepared by suspending 100 g. (dry basis) of potato starch in 350 ml. of distilled water. The starch suspension (pH 5.4) was heated rapidly to 97° C. by passing steam into the suspension and then cooked for 30 minutes at 97–100° C. The addition of steam reduced the starch solids content to 17%. The cooked or pasted starch was then cooled to 40° C. over a period of 15 minutes. The cooked starch at this point was very thick and was difficult to stir. To the cooked starch was added 67 ml. of pullulanase beer, having a pH of 8.5 and containing 2,000 units of measurable pullulanase activity, which is equivalent to 20 units of enzyme per gram of starch. 10 ml. of toluene was then added to prevent yeast growth. The starch solution was adjusted to a pH of 6.8 and maintained at a constant 40° C. Within four hours after the enzyme had been added, the Brookfield viscosity at 40° C. and 20 r.p.m. had dropped from an unmeasurably high viscosity to a viscosity of 680 centipoises. Approximately at this point the amylose began precipitating slowly, in amorphous form from the starch solution, accompanied by an increase in viscosity of up to about 2,000 cps. after about 28 hours.

The resulting starch mixture was centrifuged in 250 ml. steel bottles at 9,000 r.p.m. (about 10,000 g.) on a Serval high speed centrifuge for two hours at about 40° C. The centrifuged solution was then decanted and the residue washed three times with 250 ml. of distilled water, and again centrifuged. The final wash contained only 0.3% solids by weight. The residue was precipitated with methanol, filtered and dried at room temperature. The weight yield was 27% based on starch. The amylose rich product had a reduced viscosity of 1.54 and contained 72% amylose (dry basis). This amounted to a recovery of 70% based on the amylose originally present (27%).

EXAMPLES 2–5

The following examples show what effect various debranching times have on the separation of amylose from potato starch.

A cooked starch solution was prepared by suspending 300 g. of potato starch on a dry substance basis in 2,654 ml. of water, heating rapidly to 100° C. by passing live steam into the mixture, and cooking for 30 minutes at a temperature of between 95–100° C. The cooked starch solution was then cooled rapidly to 45° C. with stirring and treated with 660 units of pullulanase activity. The starch concentration was reduced to 8% by the addition of steam. The solution had a pH of 7.0. At various intervals of time from 0–23 hours, the Brookfield viscosity of the starch solution was determined. The viscosity determination was made at 40° C. and 20 r.p.m. Weighed portions of the starch solution were then separated from the main body and heated for 30 minutes at a temperature of 95–100° C. to deactivate the pullulanase. These aliquot portions were allowed to stand at room temperature 16 hours, whereupon they were centrifuged for 45 minutes at 9,000 r.p.m., in a Serval centrifuge. The precipitated solids enriched in amylose were washed twice with warm water (40–45° C.), dehydrated with methyl alcohol, and dried in air at room temperature and weighed. The apparent amylose content of each amylose rich product was determined.

The results obtained are reported in Table I below.

TABLE I

| Example | Enzyme treatment | | Precipitated product after centrifuging | | |
|---|---|---|---|---|---|
| | Time, hours | Viscosity, cps.[1] | Percent wt. yield | Percent apparent amylose [2] | Percent of total amylose separated |
| 2 | 0 | 1,915 | | | |
| 3 | 2 | 854 | 70 | 36 | 93 |
| 4 | 6 | 450 | 29 | 62 | 67 |
| 5 | 23 | 202 | 33 | 61 | 75 |

[1] Visc. measurements made at 40° C., 20 r.p.m., 17% solids.
[2] Amylose content based on iodine blue absorbance.

EXAMPLES 6–10

Films of amylose rich products obtained from corn and potato starches by the process described in Example 1 were prepared and compared with films prepared from various commercially available amylose. The films were prepared by the following procedure. An amylose solution was prepared by dissolving 10 parts of amylose rich product in 90 parts of water and heating to a temperature of 95° C. The solution was cooled to about 90° C. and cast on a heated glass plate thinly coated with lecithin. Before the amylose had gelled, the amylose was drawn down with a heated doctor blade to a thickness of 25 mils and cooled rapidly to room temperature whereupon the film gelled. The film was then dried at room temperature. For comparison, films were made in the same manner from corn amylose (Nepol), potato amylose (Superlose) and amylomaize containing 55% amylose. As shown in Table II below, films prepared from our amylose-rich products were equivalent in tensile strength and elongation to films made from corn and potato amylose having higher apparent amylose contents, and to a film made from amylomaize containing about the same concentration of apparent amylose.

TABLE II

| Example | Source of amylose film | Percent of apparent amylose | Tensile strength, p.s.i.[1] | Percent elongation [1] | Films thickness, mils |
|---|---|---|---|---|---|
| 6 | Corn amylose (Nepol) | 90 | 5,410 | 2.0 | 1.1 |
| 7 | Amylose-enriched corn (Ex. 1) | 65 | 5,130 | 2.4 | 1.2 |
| 8 | Amylomaize #55 | 55 | 5,100 | 1.7 | 1.1 |
| 9 | Potato amylose (Superlose) | 110 | 6,490 | 2.7 | 1.2 |
| 10 | Amylose-enriched potato (Ex. 1) | 56 | 6,780 | 3.2 | 1.1 |

[1] Measurements made at a relative humidity of 50%.

When more ideal film forming conditions were employed (e.g. using defatted amylose), films having still higher tensile strength and percent elongation were obtained. For example, tensile strengths and percent elongations from one-half to two times those reported above were obtained.

EXAMPLE 11

This example shows that amylose can also be separated by the process of this invention from jet cooked corn starch. 300 grams of pearl starch was suspended in water to produce a slurry containing 10% solids d.s. and adjusted to a pH of 6.3. The slurry was introduced into a jet cooker at 140° C. with minimum hold time. The pasted starch obtained therefrom was cooled rapidly to 45° C. and treated for 18 hours with pullulanase in an amount corresponding to 11 units of pullulanase activity per gram of starch. The Brookfield viscosity at 20 r.p.m. was below 100 cps. The precipitated product was redissolved by heating to 140° C. and reprecipitated by slow cooling over 24 hours. The reprecipitated amylose was then centrifuged at 9,000 r.p.m. and washed twice with water. After drying the residue was found to contain 77% apparent amylose.

These examples show that only a relatively short period of enzyme treatment is required in order to obtain a solid starch enriched in amylose.

EXAMPLES 12–15

A solution of potato starch containing 17% solids by weight d.s. was prepared by suspending 300 g. dry basis of potato starch in 950 ml. of water. The starch suspension was heated to 96° C. by passing steam into the suspension. After cooking ½ hour at 96° C. the starch solution was cooled rapidly to 40° C., and treated with pullulanase in an amount equivalent to 20 units of pullulanase activity per gram of starch. 10 ml. of toluene was added to prevent yeast growth. The pH at this point was 7.3. Brookfield viscosity measurements were obtained on samples of the treated starch solution at the times reported in Table III. Solid amylose-rich fractions were separated from these same samples by centrifugation for one hour at 45°–50° C. at 9,000 r.p.m. in a Serval centrifuge and isolated as described in Example 1. The results are reported in Table III.

TABLE III

| | Enzyme treatment, hours | Viscosity cps.[1] at 17% solids | Centrifuged starch mixture | | | |
|---|---|---|---|---|---|---|
| | | | | Precipitated product | | |
| | | | Decantate, viscous, cps.[1] at 13% solids | Percent wt. yield | Percent apparent amylose[2] | Percent total amylose recovered |
| Example: | | | | | | |
| 12 | .75 | 14,000 | | | | |
| 13 | 4 | 7,600 | 760 | 48 | 51 | 91 |
| 14 | 6 | 6,600 | 300 | 44 | 56 | 91 |
| 15 | 22 | 5,500 | 80 | 44 | 58 | 95 |

[1] Viscosity measurement made at 40° C. and 20 r.p.m.
[2] Calculated from iodine blue absorbance.

EXAMPLE 16

100 g. (dry basis) potato starch in 500 ml. water was adjusted to pH 7.0 with 3.5 ml. 1 M disodium phosphate buffer. The slurry was heated with live steam and cooked

TABLE IV

| | Enzyme treatment | | | | Centrifugal starch mixture | | | |
|---|---|---|---|---|---|---|---|---|
| | Before addition | | After addition | | Decantate Viscosity, cps. at 13% solids[1] | Preciptiated product | | |
| Sample | Time, hrs. | Viscosity cps. | Contact time, hrs. | Viscosity cps. | | Percent wt. Yield | Percent apparent amylose[2] | Percent total amylose recovered |
| Example: | | | | | | | | |
| 17 ---- A | 0 | 18,000 | 23 | 3,860 | 500 | 32 | 59 | 70 |
| 18 ---- B | 6½ | 28,000 | 14 | 12,000 | | | | |
| 19 | | | 24 | 8,050 | | | | |
| 20 | | | 41 | 5,400 | 500 | 40 | 52 | 78 |
| 21 ---- C | 54 | 27,000 | 65 | 5,100 | 100 | 41 | 45 | 68 |

[1] Viscosity measurements made at 40° C. and 20 r.p.m.
[2] Calculated from iodine blue abosrbance.

½ hour at 95–100° C., with stirring. After cooling rapidly over 15 minutes to 40° C., 5,000 units of pullulanase were added. This was equivalent to 50 units of enzyme per gram of starch. The starch concentration was 13.4%; pH 7.0; Brookfield viscosity (20 r.p.m.) about 20,000 cps. Toluene was added as a preservative. After 17 hours at 40° C. the viscosity was 625 cps. The mixture was centrifuged at 9,000 r.p.m. on a Serval centrifuge for one hour at 40° C. The decantate contained 11% solids and had a Brookfield viscosity of 110 cps. The amylose-rich residue was washed twice with water at 40° C. and dried. A 29% weight yield was obtained. The product had a reduced viscosity of 1.59 and contained 74% apparent amylose. This was equivalent to a recovery of 80% based on the amylose originally present in the starch.

EXAMPLES 17–21

150 g. potato starch (dry basis) was slurried in 1 liter water and adjusted to pH 6.9 with 4.4 ml. of 1 M disodium phosphate buffer. The slurry was heated rapidly to 100° C. with live steam and then cooked at 95–100° C. for ½ hour. The solution, containing 12% by weight of starch, was cooled rapidly to 80° C. and divided into three portions: A, B, and C, all of which were cooled to 40° C. in about 15 minutes. Toluene was added to each as a preservative.

(A) The first portion was treated immediately with 10 units of pullulanase activity per gram of starch and stirred slowly for 24 hours at 40° C.

(B) The second portion was allowed to stir slowly without enzyme for 6½ hours whereupon the viscosity rose as gelling occurred. The enzyme was then added (10 units per gram starch) and the mixture was stirred 41 hours at 40° C.

(C) The third portion was allowed to stir slowly without enzyme for 54 hours to obtain maximum gelling. The enzyme was than added as in (A) and (B).

Table IV shows that in each case the enzyme reduced the Brookfield viscosities at 40° C. to a point that separation of an amylose rich fraction was achieved by the method described in Example 1. The enzyme was most effective, however, when added immediately after the starch was pasted.

EXAMPLE 22

This example shows that the enzyme can be added to the starch slurry prior to cooking. Preferably though, the enzyme is added after the starch has been cooked to minimize deactivation of the enzyme.

200 g. (dry basis) potato starch was slurried in 1800 ml. $H_2O$ and 50 ml. 1 N sodium phosphate buffer (pH 7) at 40° C. and 4000 units pullulanase were added. The mixture was then cooked through a jet cooker in 4 minutes time at 80° C. and discharged, without holding, to a flask where it was cooled rapidly with strong stirring to 40° C. A control experiment was run in the same way but with no enzyme. After 1.5 hours the control (no enzyme) had a Brookfield viscosity of 7,000 whereas the enzyme treated run had 725 cps. An amylose rich product was separated in 15% weight yield by centrifuging at 10,000 r.p.m.

EXAMPLE 23

300 g. tapioca starch was slurried in 2,200 ml. $H_2O$ at 50° C. and pH 6.8. The slurry was heated rapidly to 90–95° C. by passing steam below the surface of the starch slurry and maintained at that temperature with stirring, for 15 minutes with a heating mantle. The thick solution was cooled over 15 minutes to 40° C. and treated with 6,000 units pullulanase activity, which were dissolved in 0.025 molar sodium phosphate buffer, pH 7. The concentration of the enzyme solution was 30 units per ml. This was equivalent to 20 units per gram starch. The starch concentration was 11.1% by weight. Toluene was added as a preservative and the mixture stirred 22 hours at 40° C. The starch mixture at this point had a Brookfield viscosity of 130 cps. at 40° C. An amylose-rich product was isolated in 24% weight yield by centrifuging at 10,000 r.p.m., and washing twice with two parts water. The product contained 69% apparent amylose which is 83% recovery of amylose based on 20% amylose in the parent tapioca starch.

Since many embodiments of this invention can be made and since many changes can be made in the embodiments

I claim:
1. A process for production of a solid starch fraction enriched in amylose comprising:
   (A) cooking a suspension comprising between about 2.5% and 40% by weight of a starch containing a substantial amount of amylose, and between 60% and 97.5% by weight water, at a temperature and for a time sufficient to transform said suspension into a fluid solution without causing substantial degradation of the starch molecules;
   (B) bringing said fluid solution to temperature in a range at which enzyme exhibiting pullulanase activity is not substantially deactivated, the solution being brought to said temperature under such conditions that the solution is not stabilized;
   (C) adding to said fluid solution an amount of enzyme exhibiting pullulanase activity sufficient to effectively initiate the separation of a solid starch fraction enriched in amylose from said fluid solution;
   (D) holding said enzyme-containing solution in said temperature range for a sufficient time to cause a solid starch fraction enriched in amylose to be released from said fluid solution; and
   (E) separating said solid starch fraction enriched in amylose from the remainder of said fluid solution.

2. The process of claim 1 wherein said sufficient time for said solid starch fraction enriched in amylose to be released from said fluid solution is a period of time such that the viscosity of said fluid solution is reduced to a viscosity of below 10,000 centipoises measured at 40° C.

3. The process of claim 2 wherein said suspension comprises between 10% and 25% by weight of the starch containing a substantial amount of amylose, and between 75% and 90% by weight water.

4. The process of claim 2 wherein said enzyme is pullulanase.

5. The process of claim 4 wherein said pullulanase is obtained from the organism *Aerobacter aerogenes*.

6. The process of claim 4 wherein said fluid solution is adjusted to a pH of between 5.0 and 8.5 prior to the addition of the pullulanase.

7. The process of claim 4 wherein said fluid solution is adjusted to a pH of between 6.0 and 7.5 prior to the addition of the pullulanase.

8. The process of claim 6 wherein said temperature is below 70° C.

9. The process of claim 6 wherein said temperature is between 30° C. and 50° C.

References Cited

UNITED STATES PATENTS 3,067,067   12/1969   Etheridge et al. _____ 127—71

OTHER REFERENCES

Bender et al.: Biochemische Zietschrift, 334, pp. 79–95 (1961).

Bender et al.: Advances in Enzymology, vol. 8, pp. 555–559, Academic Press, New York, N.Y., 1965.

Greenwood et al.: Adv. in Carbohydrate Chemistry, vol. 23, 1968, pp. 360–363, Academic Press.

LIONEL M. SHAPIRO, Primary Examiner

J. L. WINDE, Assistant Examiner

U.S. Cl. X.R.

127—65, 71; 195—2, 7